(12) United States Patent
Heffner

(10) Patent No.: US 7,758,911 B2
(45) Date of Patent: Jul. 20, 2010

(54) MICROELECTRONIC SECURITY COATINGS

(75) Inventor: Kenneth H. Heffner, Largo, FL (US)

(73) Assignee: Honeywell International Inc., Morristown, NJ (US)

( * ) Notice: Subject to any disclaimer, the term of this patent is extended or adjusted under 35 U.S.C. 154(b) by 356 days.

(21) Appl. No.: 10/434,440

(22) Filed: May 8, 2003

(65) Prior Publication Data

US 2004/0222014 A1 Nov. 11, 2004

(51) Int. Cl.
B05D 5/12 (2006.01)

(52) U.S. Cl. .......................... 427/58; 427/96.2; 427/402

(58) Field of Classification Search .................... 427/58, 427/402, 77, 157, 96.2–96.6
See application file for complete search history.

(56) References Cited

U.S. PATENT DOCUMENTS

| | | | | |
|---|---|---|---|---|
| 4,756,977 A | * | 7/1988 | Haluska et al. | 428/704 |
| 5,468,990 A | | 11/1995 | Daum | |
| 5,568,124 A | * | 10/1996 | Joyce et al. | 340/550 |
| 5,762,711 A | | 6/1998 | Heffner et al. | |
| 5,821,582 A | * | 10/1998 | Daum | 257/327 |
| 5,877,093 A | * | 3/1999 | Heffner et al. | 438/761 |
| 6,110,537 A | | 8/2000 | Heffner et al. | |
| 6,198,155 B1 | * | 3/2001 | Verhaegh et al. | 257/588 |
| 6,287,985 B1 | | 9/2001 | Heffner et al. | |
| 6,319,740 B1 | | 11/2001 | Heffner et al. | |
| 6,414,884 B1 | * | 7/2002 | DeFelice et al. | 365/195 |
| 6,496,022 B1 | * | 12/2002 | Kash et al. | 324/752 |
| 2001/0033012 A1 | | 10/2001 | Koemmlerling | |
| 2001/0056542 A1 | | 12/2001 | Cesana et al. | |
| 2002/0199111 A1 | * | 12/2002 | Clark et al. | 713/194 |
| 2003/0066637 A1 | * | 4/2003 | Zimman | 165/185 |
| 2003/0122138 A1 | * | 7/2003 | Kash et al. | 257/80 |
| 2004/0112967 A1 | * | 6/2004 | Krappe et al. | 235/492 |
| 2004/0222802 A1 | * | 11/2004 | Chou et al. | 324/661 |

FOREIGN PATENT DOCUMENTS

| | | |
|---|---|---|
| DE | 100 65 747 A | 7/2002 |
| EP | 0972632 A | 1/2000 |

* cited by examiner

*Primary Examiner*—Brian K Talbot
(74) *Attorney, Agent, or Firm*—Shumaker & Sieffert, P.A.

(57) ABSTRACT

A security coating on an electronic circuit assembly comprises a mesh coating that may have a unique signature pattern and comprise materials that easily produce an image of the signature so that it is possible to determine if reverse engineering has been attempted. Spaces in the mesh may include electrical components to erase circuit codes to destroy the functionality and value of the protected die if the mesh coated is disturbed. The voids may include compositions to enhance the mesh signature and abrade the circuit if tampering takes place.

25 Claims, 4 Drawing Sheets

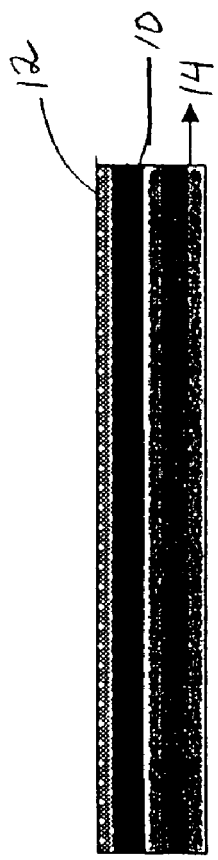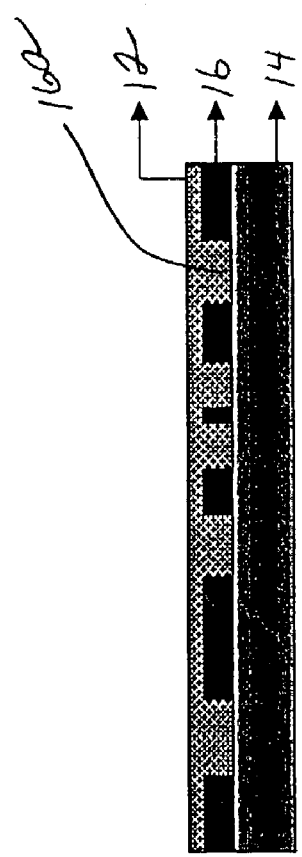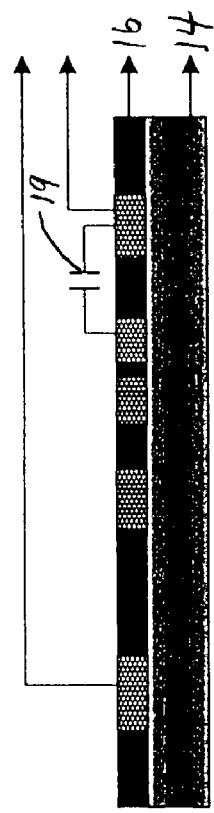

MICROELECTRONIC SECURITY COATINGS

BACKGROUND

This invention relates to techniques for applying security coatings to microelectronic circuits.

Coatings are applied to microelectronic circuits to restrict reverse engineering of the circuit layout and deny access to embedded codes. Coatings can provide a physical barrier that destroys the underlying components when the coating is manipulated in some fashion, e.g. cut or tampered with. Current techniques, in general, involve applying one or more single-layer or single-component coatings, e.g., as depicted in FIG. 1, where a primer 10 and a protective coating 12 cover a circuit set or die 14. Coatings may also provide a protective barrier to certain forms of electromagnetic inspection.

Despite significant strides in this area, among them the use of thermal spray to apply coatings described in U.S. Pat. Nos. 6,319,740, 6,287,985, 6,110,537, 5,877,093 and 5,762,711, industry desires higher security as more valuable information is stored in electronic circuits that are increasingly used to support the economic and sustaining infrastructures of the world. The higher value information resident in electronic circuits and their designs raises the risk of unauthorized reverse engineering of the protected system and a resultant loss of valuable information through unauthorized duplication, spoofing and use of such "target devices", any electronic system that contains components that require protection from physical, chemical, electrical, acoustic or spectral methods of inspection.

SUMMARY

An object of the present invention is to provide superior security coatings for target devices.

According to the invention, instead of applying a single-component coating as a protective coating or base layer for other coatings, a mesh layer is applied, with which other coatings or features can be applied or inserted. Mesh not only improves the mechanical properties between a single component coating, the device and other security layers and components, it provides a barrier that is difficult to penetrate with invasive and non-invasive inspection processes that are often used to reverse engineer the underlying circuitry and access critical, embedded codes.

According to one aspect of the invention the mesh coating is applied randomly by hand or a programmed applicator, e.g. using Computer assisted design (CAD) deposition wherein the beaded mesh pattern is predetermined and is robotically, site directed to enable a unique pattern of deposition for each coated device or batch of devices.

According to one aspect of the invention, the mesh coating is a preformed sheet.

According to one aspect of the invention individual mesh elements are created according to a pre-determined or randomized pattern to produce what may be called a distinctive "signature" mesh pattern that can be read by a non-invasive inspection method. Attempts to tamper with the protected circuit will alter the signature, which can be detected by inspecting the mesh.

According to one aspect of the invention, an active device, such as a piezoelectric transducer, is inserted between one or more of the mesh elements. If the mesh is disturbed, the transducer output triggers an instruction set to the circuit to initiate an erase or corrupt sequence of the valued code in the critical software physical domain of the target device.

According to one aspect of the invention, abrasive materials are inserted in the mesh that physically damage the circuit when the mesh is disturbed.

According to another aspect of the invention, the mesh coating may be applied at another layer level of the security coating to provide a signature pattern for the coating.

According to one aspect of the invention, safe levels of alpha-emitting materials are incorporated into the mesh, providing a signature emission pattern or a serve as the basis of an embedded sensor.

According to one aspect of the invention the opened regions formed by the mesh are filled with a material different in composition and physical features from the mesh material that absorb, reflect, or diffuse acoustic and electromagnetic radiation to degrade the circuit image obtained using electromagnetic radiation imaging devices.

According to one aspect of the invention the opened regions formed by the mesh are filled with a material different in composition and physical features from the mesh material that enhance the signature character of the mesh coating.

Other objects, aspects, features, and benefits of the invention will be apparent from the description and drawings

BRIEF DESCRIPTION OF THE DRAWING

FIG. 1 shows a die that has been coded according to the prior art.

FIG. 2 shows a die coated according to the invention, using a mesh and barrier coating.

FIG. 3 shows a die covered by a mesh wherein the mesh spaces are filled with an electronic device.

DESCRIPTION

Figure 4:
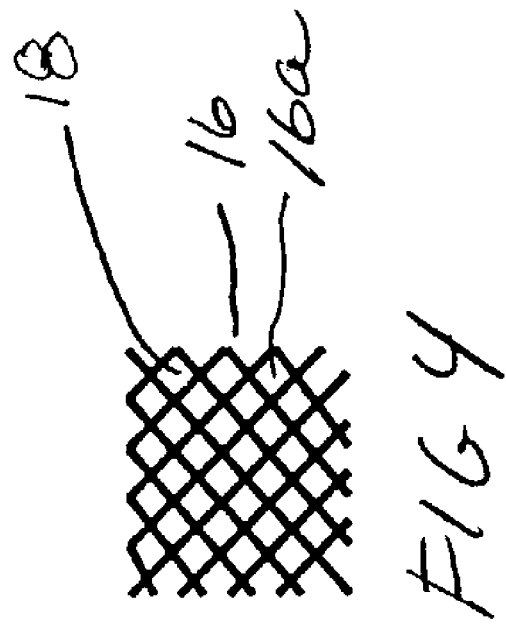
FIG. 4 is a typical plan view of a mesh pattern.
Figure 6:
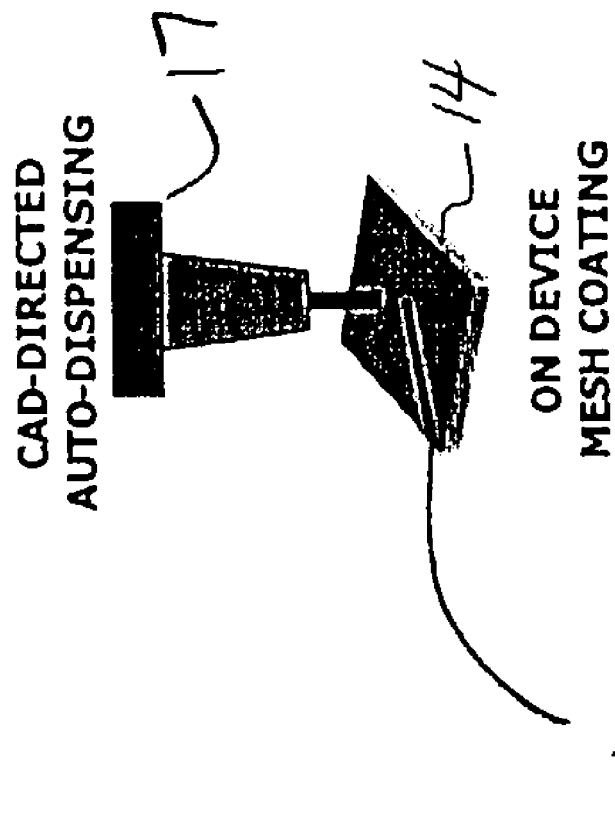
FIG. 6 shows a computer assisted design deposition of the mesh pattern.

In contrast with the prior art coating shown in FIG. 1, FIGS. 2 and 3 demonstrate the use of a mesh coating 16 on a circuit or die 14. In FIG. 2, a protective coating 12 is applied that fills the spaces or voids 16a in the mesh, shown best in FIG. 4. In FIG. 3, where the protective coating 12 is also used, the voids 16a first are filled with an active electrical device 19 that produces, when disturbed, an electrical signal initiating a software instruction for erasing or corrupting all or part of stored, critical code imbedded in the circuit 14. This active device 19, in effect a sensor, may be a charged capacitor (powered component) or a piezoelectric transducer (unpowered component). A protective coating like the coating 12 in FIG. 1 can be applied over the mesh using a thermal spray method as explained in the patents enumerated above. The mesh coating can also be modified to include multiple layers of meshed coatings.

Figure 5:
FIG. 5 is a perspective showing a mesh overlaying a die

Referring to FIG. 5, the mesh 16 may have three-dimensional characteristics; that is, the mesh is slightly elevated at points and may or may not be uniform in standoff height from the die. The pattern of the individual mesh elements 16b can follow a random or uniform pattern that results in differences in opacity, refractive index, density, hardness, molecular weight, atomic weight, dielectric constant, chemical reactivity and thermal conductivity across the mesh coating. As a result the appearance of the circuit from above the mesh coating is occluded. Thus, a meaningful image of the underlying die layout is obstructed for non-invasive and invasive inspection methods. Moreover, slicing away the mesh, an invasive inspection, will destroy portions of the die where the mesh is attached, scrambling the circuit configuration.

Figure 7:
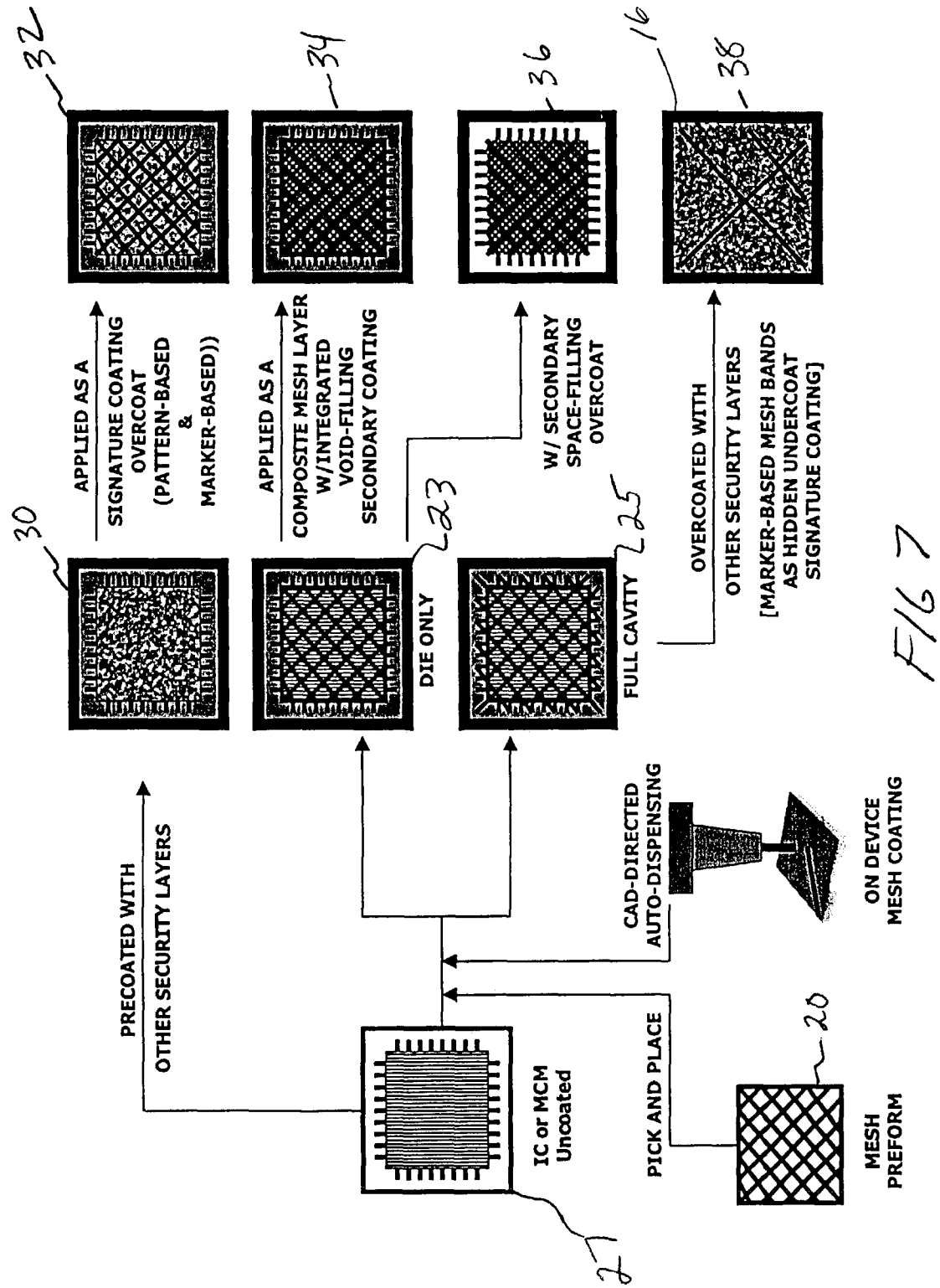
FIG. 7 shows different ways to apply a mesh to an uncoated integrated circuit or multichip module to produce different security characteristics.

Different ways to apply the mesh are shown in FIG. 7. The mesh may be a preformed material sheet 20 that is prepared to the proper size to cover just a die 23 or the full cavity 25 of the target device 27 (an uncoated integrated circuit or multichip module). The mesh may also be painted-on or sprayed-on in a random or signature (unique identifying) pattern using a CAD-controlled auto-dispenser 17. The preformed mesh 20 can also be a signature coating.

In some applications, a monolithic pre-coat 30 is applied to the device 27 which is followed by a mesh topcoat to produce the coating configuration 32, where any tampering with the mesh top coat could be detected as a change in the signature imbedded in the mesh layout.

Coating configurations 34, 36, 38 show different ways to apply an overcoat on the mesh for die-only and full or partial microelectronic assemblies (e.g. multichip modules). In configurations 34 and 36, the result is a composite mesh layer with an integrated void-filling secondary coating. The difference between the two is that in arrangement 34 the entire device 27 is coated; in the arrangement 36 just the die is coated. In coating configurations 38, the overcoat covers the entire mesh 16 and the mesh elements 16b can be marker-based, as explained below, to provide a hidden undercoat signature, in addition to the signature of the mesh pattern.

The mesh can be constructed from a single bead or from pre-formed components that may be either as a single organic or inorganic resin material or as a composite blend of resin with filler. The mesh composition should yield an adherent and coherent mixture that can be fully cured to a hardened mesh pattern (or cure as the material is deposited). The mesh material may be capable of being B-staged, permitting interaction with other coating layers and subsequent curing, yielding a hardened mesh pattern that is fused to the circuit and the overcoat coatings. The mesh coating can include a UV-fluorescent die or non-toxic levels of an alpha emitter (e.g. $^{241}$Am) that are incorporated into predetermined strands or banded patterns, producing a distinctive identifying signature pattern under light activation or by a scintillator. Materials uniquely detectable by short wave and long wave view the light or by other electromagnetic radiation detection methods may be selectively incorporated into individual mesh strands for the same purpose. Safe levels of particle-emitting materials may included in the mesh (16). The signature can be imaged from such energy emissions.

The spaces 16a in the mesh may be filled with highly abrasive particle compositions to obstruct access to critical or sensitive computer program device design information. Filler materials damage the critical elements of the target device if attempts to slice or mechanically remove the mesh 16 are made. Some or all of the spaces 16a can be filled with materials that absorb, reflect, or diffuse acoustic and electromagnetic radiation to degrade the circuit image obtained using non-intrusive imaging methods. The mesh or a material in the spaces can comprise safe levels of energy emitting materials, such as alpha particles, that can be externally detected to produce an image of the mesh signature or its outline.

One skilled in the art may make modifications, in whole or in part, to an embodiment of the invention and its various functions and components without departing from the true scope and spirit of the invention.

The invention claimed is:

1. A method for securing a microelectronic circuit, the method comprising:
    depositing a mesh coating in a unique pattern over the microelectronic circuit, wherein the mesh coating has a detectable signature associated therewith for detection by a non-invasive inspection method;
    incorporating alpha-emitting materials into the mesh coating, wherein the detectable signature is related to alpha emissions from the alpha-emitting materials in the mesh coating; and
    applying a protective coating over the mesh coating, wherein the protective coating fills voids in the mesh coating, and wherein the signature is detectable through the protective coating.

2. The method of claim 1, wherein the protective coating is applied using a thermal spray method.

3. The method of claim 1, wherein depositing the mesh coating includes applying a preformed material sheet to the microelectronic circuit.

4. The method of claim 1, wherein the mesh coating comprises a plurality of mesh layers.

5. The method of claim 3, further comprising preparing the preformed material sheet to be a proper size to cover only the microelectronic circuit.

6. The method of claim 1, wherein the mesh coating comprises strands of different materials.

7. The method of claim 3, further comprising preparing the preformed material sheet to be a proper size to cover a full cavity in a multichip module encompassing the microelectronic circuit.

8. The method of claim 1, wherein the detectable signature associated with the unique pattern is due to a characteristic selected from the group consisting of opacity, refractive index, density, hardness, molecular weight, atomic weight, dielectric constant, chemical reactivity, and thermal conductivity.

9. The method of claim 1, further comprising applying a monolithic pre-coat to the microelectronic circuit prior to depositing the mesh coating.

10. The method of claim 1, wherein the mesh coating comprises a resin material.

11. The method of claim 1, further comprising including a marker within the mesh coating to produce the unique pattern resulting in the detectable signature.

12. The method of claim 11, wherein the marker is selected from the group consisting of at least one of a UV-fluorescent material, an alpha emitter, a material detectable by electromagnetic radiation detection, and a particle emitter.

13. The method of claim 1, wherein the unique pattern is unique for each microelectronic circuit.

14. The method of claim 1, wherein the unique pattern is unique for a batch of microelectronic circuits.

15. The method of claim 1, wherein the mesh coating is uniformly fused to the circuit so that the circuit will be damaged if the mesh coating is removed.

16. The method of claim 1, further comprising inserting an active device in the mesh coating, wherein the active device causes the microelectronic circuit to alter code when the mesh coating is disturbed in such a way to be detected by the active device.

17. The method of claim 16, wherein the active device is a powered component.

18. The method of claim 16, wherein the active device is a charged capacitor.

19. The method of claim 16, wherein the active device is an unpowered component.

20. The method of claim 16, wherein the active device is a piezoelectric transducer having an output that triggers an instruction set to the microelectronic circuit to initiate an erasing software code.

21. The method of claim 16, wherein the active device is a piezoelectric transducer having an output that triggers an instruction set to the microelectronic circuit to initiate corrupting software code.

22. The method of claim 1, further comprising inserting abrasive materials in the mesh coating, wherein disturbance to the mesh coating causes the abrasive materials to physically damage the microelectronic circuit.

23. The method of claim 1, wherein the mesh coating has open regions, further comprising filling the open regions with a material differing in composition and physical features from that used of the mesh coating, wherein the material filling the open regions degrades a circuit image obtained using an electromagnetic radiation imaging device.

24. The method of claim 1, wherein the mesh coating is deposited randomly by hand.

25. The method of claim 1, wherein the mesh coating is deposited by a programmed applicator.

* * * * *